US010631477B2

(12) United States Patent
Larue

(10) Patent No.: US 10,631,477 B2
(45) Date of Patent: Apr. 28, 2020

(54) SYSTEM AND METHOD FOR IRRIGATION MANAGEMENT

(71) Applicant: Valmont Industries, Inc., Omaha, NE (US)

(72) Inventor: Jacob L. Larue, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 20 days.

(21) Appl. No.: 16/169,115

(22) Filed: Oct. 24, 2018

(65) Prior Publication Data

US 2019/0124859 A1 May 2, 2019

Related U.S. Application Data

(60) Provisional application No. 62/578,688, filed on Oct. 30, 2017.

(51) Int. Cl.
*A01G 25/16* (2006.01)
*A01G 25/09* (2006.01)
(Continued)

(52) U.S. Cl.
CPC ........... *A01G 25/167* (2013.01); *A01G 25/09* (2013.01); *A01G 25/092* (2013.01); *G01W 1/02* (2013.01); *G06K 9/00657* (2013.01)

(58) Field of Classification Search
CPC .... A01G 25/167; A01G 25/092; A01G 25/09; G06K 9/00657; G01W 1/02
See application file for complete search history.

(56) References Cited

U.S. PATENT DOCUMENTS 9,202,252 B1 * 12/2015 Smith ................... G06Q 50/02
9,284,569 B2    3/2016 Krichevsky
(Continued)

FOREIGN PATENT DOCUMENTS

WO    2014014850 A2    1/2014
WO    2016061169 A1    4/2016
(Continued)

*Primary Examiner* — Charles R Kasenge
(74) *Attorney, Agent, or Firm* — Milligan PC LLO

(57) ABSTRACT

The present invention provides a system and method which includes a crop/soil analysis module which analyzes data collected and feeds the machine learning module, from one or more sources including imaging data from UAVs, satellites, span mounted crop sensors, in situ field and weather sensors. According to a further preferred embodiment, aerial data is combined and overlaid with span mounted sensor data in near real-time to generate irrigation management recommendations. According to a further preferred embodiment, the span mounted sensors may preferably provide field specific data of current field conditions and may preferably use the system's analytics to calculate crop water use and crop water stress index. According to a further preferred embodiment, vegetation indexes may preferably be calculated as checks against the values calculated from the aerial data and to provide information if cloud cover or other atmospheric interference is present. According to a further preferred embodiment, the crop/soil analysis module may further interface with the drive control and applicant pressure controls to autonomously create and execute an irrigation plan which includes custom drive instructions and applicant dispersal rates for a given field.

15 Claims, 3 Drawing Sheets

(51) Int. Cl.
*G06K 9/00* (2006.01)
*G01W 1/02* (2006.01)

(56) References Cited

U.S. PATENT DOCUMENTS

| | | | |
|---|---|---|---|
| 9,408,342 B2 | 8/2016 | Lindores | |
| 9,569,803 B1* | 2/2017 | France | G06Q 50/02 |
| 9,880,537 B2* | 1/2018 | Mewes | G05B 19/042 |
| 9,886,016 B2* | 2/2018 | Bermudez Rodriguez | G05B 19/042 |
| 9,983,041 B1* | 5/2018 | Jerphagnon | A01G 25/16 |
| 10,028,426 B2* | 7/2018 | Schildroth | B64C 39/024 |
| 10,139,797 B2* | 11/2018 | Mewes | G05B 19/042 |
| 10,241,488 B2* | 3/2019 | Bermudez Rodriguez | G05B 19/042 |
| 10,255,670 B1* | 4/2019 | Wu | H04N 5/2252 |
| 10,474,975 B1* | 11/2019 | France | G01F 23/296 |
| 2011/0301755 A1 | 12/2011 | Anderson | |
| 2012/0290140 A1* | 11/2012 | Groeneveld | A01G 22/00 700/284 |
| 2013/0153673 A1 | 6/2013 | Younis et al. | |
| 2014/0263822 A1 | 9/2014 | Malveaux | |
| 2015/0278966 A1 | 10/2015 | Johnson | |
| 2015/0370935 A1* | 12/2015 | Starr | G06Q 50/02 703/11 |
| 2016/0124433 A1 | 5/2016 | Cavender-Bares | |
| 2016/0202679 A1* | 7/2016 | Bermudez Rodriguez | G05B 19/042 700/284 |
| 2016/0260021 A1 | 9/2016 | Marek | |
| 2016/0302351 A1* | 10/2016 | Schildroth | A01B 79/005 |
| 2016/0334276 A1 | 11/2016 | Pluvinage | |
| 2017/0038749 A1* | 2/2017 | Mewes | G05B 19/042 |
| 2017/0251589 A1 | 9/2017 | Tippery et al. | |
| 2017/0357230 A1* | 12/2017 | Bermudez Rodriguez | G05B 19/042 |
| 2018/0014452 A1* | 1/2018 | Starr | A01M 7/0089 |
| 2018/0059691 A1* | 3/2018 | Fleming | G05B 19/0426 |
| 2018/0164762 A1* | 6/2018 | Mewes | G05B 19/042 |
| 2018/0314949 A1* | 11/2018 | Bender | G06Q 50/02 |
| 2018/0348714 A1* | 12/2018 | Larue | G05B 13/041 |
| 2018/0368338 A1* | 12/2018 | Jerphagnon | A01G 25/16 |

FOREIGN PATENT DOCUMENTS

| | | |
|---|---|---|
| WO | 2016077883 A1 | 5/2016 |
| WO | 2016110832 A1 | 7/2016 |
| WO | 2016176355 A1 | 11/2016 |
| WO | 2016181403 A1 | 11/2016 |

\* cited by examiner

SYSTEM AND METHOD FOR IRRIGATION MANAGEMENT

RELATED APPLICATIONS

The present application claims priority to U.S. Provisional Application No. 62/578,688 filed Oct. 30, 2017.

BACKGROUND AND FIELD OF THE PRESENT INVENTION

Field of the Present Invention

The present invention relates generally to a system and method for irrigation management and, more particularly, to a system and method or the use of satellite, aerial and mounted sensor data for irrigation management.

Background of the Invention

The ability to monitor and control the amount of water and/or crop production products (applicants) applied to an agricultural field has increased the number of farmable acres in the world and increases the likelihood of a profitable crop. Known irrigation systems typically include a control device configured to furnish a user interface allowing the operator to monitor and control one or more functions or operations of the irrigation system. Knowing the status of a crop and irrigated field is a challenge for owners and operators of center pivot and linear irrigation machines with the currently available technologies.

Soil water content monitoring in a field is the most commonly used tool for determining when and how much to irrigate. Various packages are available for monitoring soil water content and they are costly and/or time consuming to install and manage and do not provide a good view of the soil water content status across the entire field. To do a good job of soil water content monitoring in many fields requires three, four or more soil sensors monitoring the water content at a series of depths. However, even with multiple soil water content sensors and manual investigation at multiple locations in a given field, the actual area and depth of the soil where the soil water content is measured is limited. Further, accessing, applying and interpreting the soil water content data to map an entire field usually provides only generalized results. Additionally, presently used sensors in a field are an obstruction to field operations.

Known prior art system have attempted to use aerial data to assist in field monitoring. For example, U.S. Published Application No. 2012/0290140A1 discloses a system which uses aerial data to make a set of moisture calculations for a given field. However, it does not use any other data sources. In a second example, U.S. Published Application No. 2016/0088807A1 discloses the use of sensors to manage irrigation operations generally.

In order to overcome the limitations of the prior art, a system is needed which is able to collect and integrate data from a variety of sources. Further, a system is needed which can analyze data and provide a field-wide irrigation management map which can be updated in real-time time with additional data and sensor readings. This information can then be compared to or used to update the water balance model for the field.

SUMMARY OF THE PRESENT INVENTION

To address the shortcomings presented in the prior art, the present invention provides a system and method which includes a crop/soil analysis module which analyzes data collected from one or more sources including imaging and water content sensing data from UAVs, MAVs, satellites, span mounted crop sensors, in situ field sensors and weather sensors. According to a further preferred embodiment, aerial data is combined and overlaid with span mounted sensor data in near real-time to generate irrigation and crop management recommendations. According to a further preferred embodiment, the span mounted sensors may preferably provide field specific data of current field conditions and may preferably use the system's analytics to calculate crop water use and crop water stress index. According to a further preferred embodiment, data from span mounted sensors may preferably be used to supplement and/or validate values calculated from the aerial data and to provide information if cloud cover or other atmospheric interference is present. Additionally, in situ field sensors may be used to provide backup data. According to a further preferred embodiment, the crop/soil analysis module may further interface with the drive control and applicant pressure controls to autonomously create and execute an irrigation and/or crop plan which includes custom drive instructions and applicant dispersal rates for a given field.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
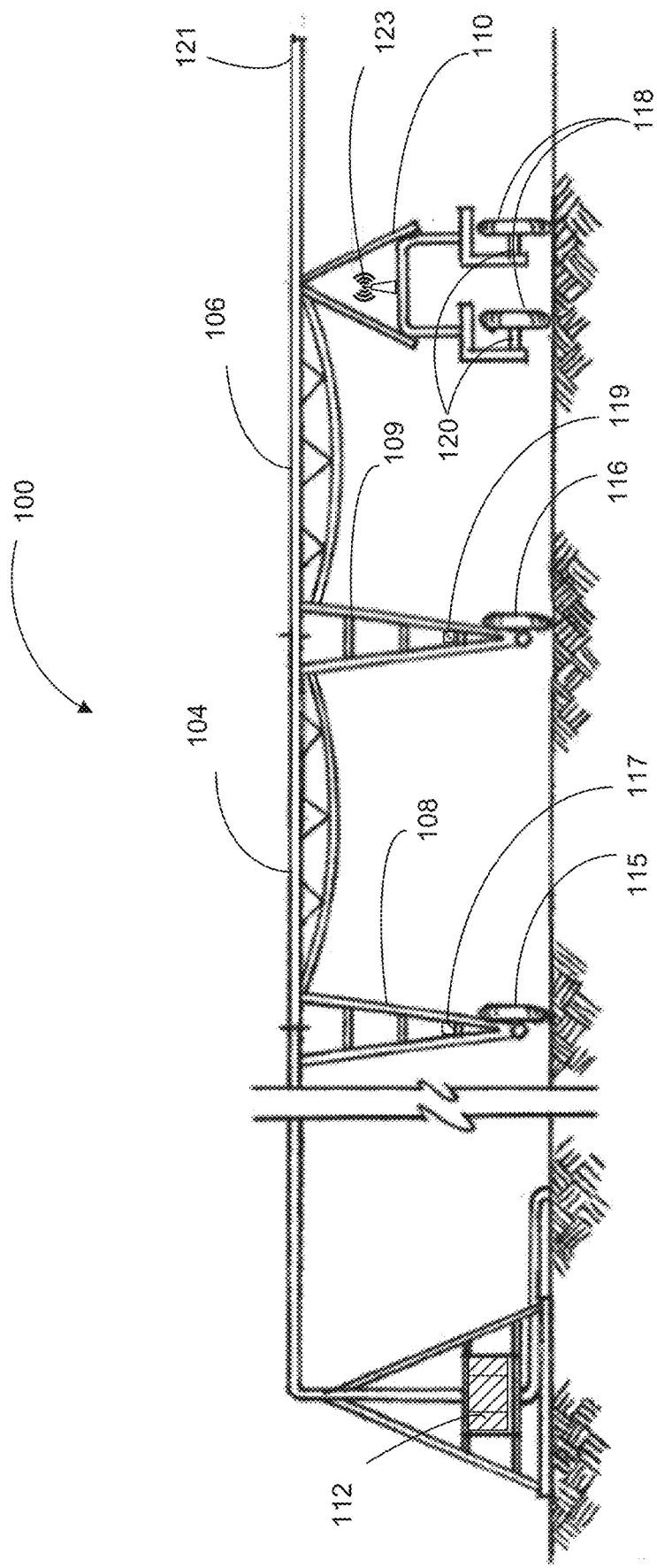
FIG. 1 shows an exemplary linear irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. Data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention. The present invention may further include transmitting and receiving data from remote and/or cloud-based data sources to implement aspects of the present invention without limitation.

Figure 2:
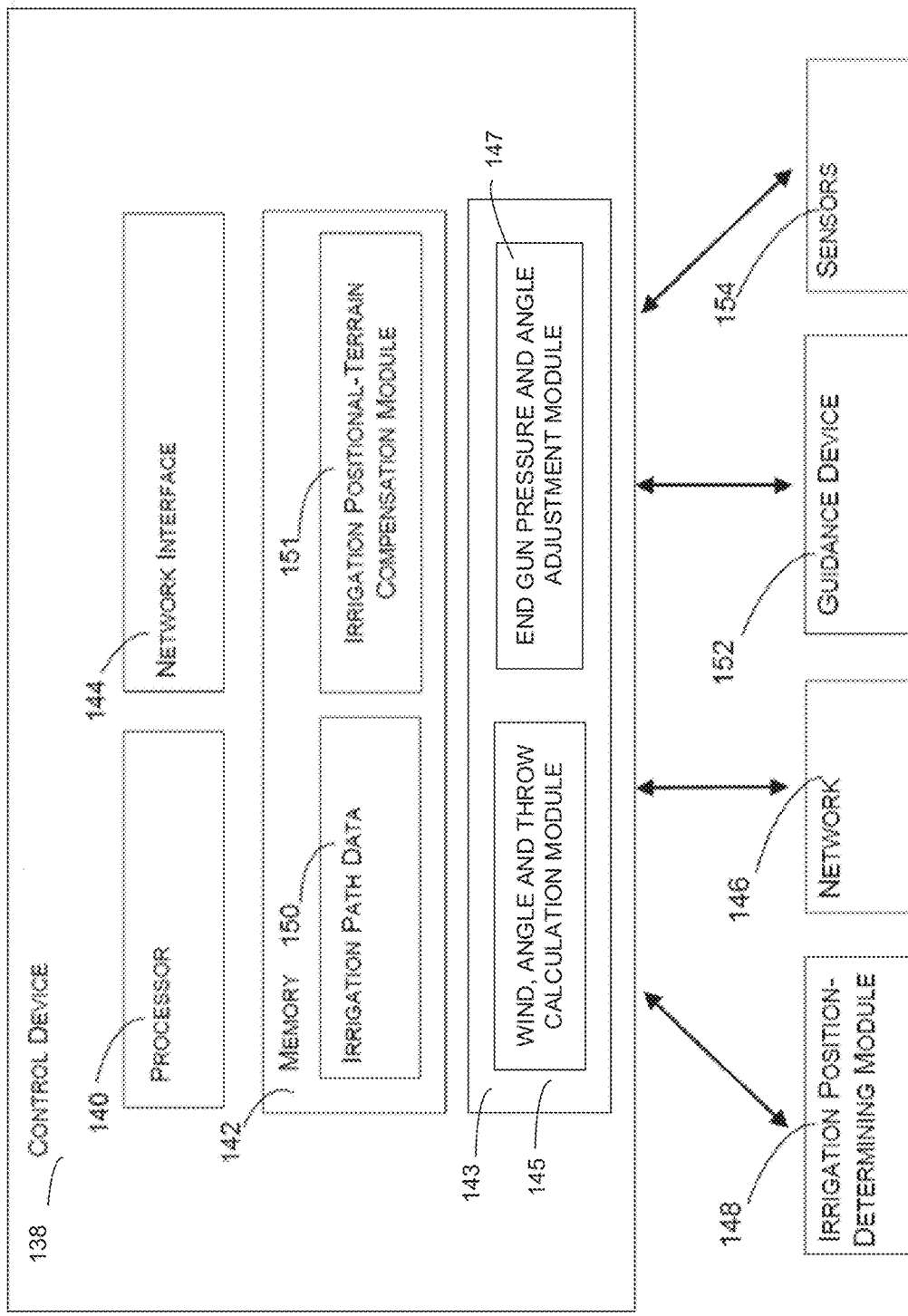
FIG. 2 shows a block diagram illustrating the exemplary processing architecture of a control device in according with a first preferred embodiment of the present invention.
Figure 3:
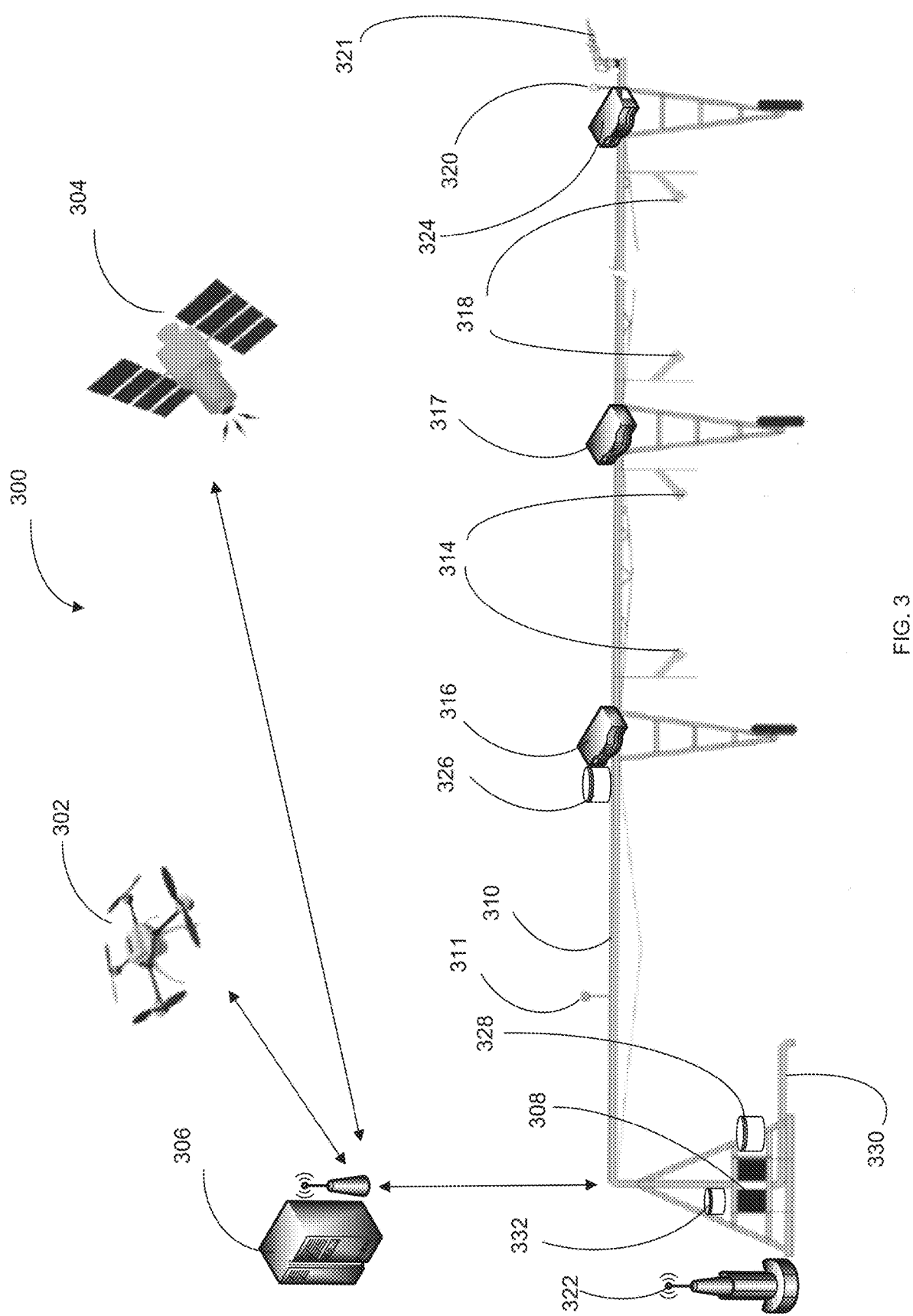
FIG. 3 shows a block diagram in accordance with further preferred embodiment of the present invention including various sensors which may be used with the present invention.

FIGS. 1-3 illustrate various configurations of irrigation systems which may be used with example implementations of the present invention. As should be understood, the irrigation systems shown in FIGS. 1-3 are exemplary systems onto which the features of the present invention may be integrated. Accordingly, FIGS. 1-3 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

With reference now to FIG. 1, spans 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown). As further shown, a position sensor 123 may be provided to provide positional and angular orientation data for the system of the present invention as discussed further below. As further shown, a control panel 112 is shown for enclosing elements of an exemplary control device 150 as discussed further below. It should be further understood that FIG. 1 provides an illustration of an irrigation machine 100 without many added powered elements and sensors. However, any of a variety of different sensing systems may be added without limitation.

With reference now to FIG. 2, an exemplary control device 138 which represents functionality to control one or more operational aspects of the irrigation system 100 will now be discussed. As shown, the exemplary control device 138 includes a processor 140, a memory 142, and a network interface 144. The processor 140 provides processing functionality for the control device 138 and may include any number of processors, micro-controllers, or other processing systems. The processor 140 may execute one or more software programs that implement techniques described herein. Further, the processor may be configured to transmit and receive data from remote and/or cloud-based data sources and processors to implement aspects of the present invention. The memory 142 is an example of tangible computer-readable media that provides storage functionality to store various data associated with the operation of the software program and code segments mentioned above, or other data to instruct the processor 140 and other elements of the control device 138 to perform the steps described herein. The memory 142 may include, for example, removable and non-removable memory elements such as RAM, ROM, Flash (e.g. SD Card, mini-SD card, micro-SD Card), magnetic, optical, USB memory devices, and so forth. The memory 142 may further provide storage for sets of instructions or modules such as, for example, an irrigation path data module 150, a positional-terrain compensation module 151 and the like. The network interface 144 provides functionality to enable the control device 138 to communicate with one or more networks 146 through a variety of components such as wireless access points, transceivers and so forth, and any associated software employed by these components (e.g., drivers, configuration software, and so on).

In implementations, the irrigation position-determining module 148 may include a global positioning system (GPS) receiver or the like to calculate a location and/or position of the irrigation system 100. Further, the control device 138 may be coupled to guidance device or similar system 152 of the irrigation system 100 (e.g. steeling assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

With reference now to FIG. 3, a further detailed embodiment of the present invention shall now be discussed. Unlike the exemplary example of FIG. 1, the exemplary irrigation system 300 shown in FIG. 3 is a center-pivot irrigation system. However, as stated above, the present invention may be used and implement in any irrigation system regardless of whether it is linear, center pivot or corner machine. As shown in FIG. 3, the present invention is preferably implemented by attaching elements of the present invention to one or more spans 310 of an irrigation system which is connected to a water or well source 330. As further shown, the exemplary irrigation system further preferably includes transducers 326, 328 which are provided to monitor the water pressure, as well as drive units 316, 317, 324 which are preferably programmed to monitor and control portions of the irrigation unit drive system. The placements of the transducers 326, 328 and other components of the illustrated system are purely exemplary in accordance with preferred embodiments. It should be understood that any component discussed herein may be relocated or removed without limitation. For example, the transducers 326, 328 may be placed on all, some or none of the drive units.

Further, the system of the present invention preferably further includes elements such as a GPS receiver 320 for receiving positional data and a flow meter 332 for monitoring water flow in the system. Still further, in accordance with a further preferred embodiment of the present invention, the system further includes indirect crop sensors 314, 318 which preferably may include sensors which could indirectly determine the moisture levels in a given area of soil and may include direct in field crop or soil sensors. Additionally, the sensors 314, 318 may be mounted on, below or above and may further include optics to allow for the detection of crop type, stage of grown, health, presence of disease, rate of growth and the like. Still further, the detection system may further include a weather station 322 or the like which is able to measure weather features such as humidity, pressure, precipitation, solar radiation, temperature and the like. Still further, the system may include a wireless transceiver/router 311 for receiving and transmitting signals between system elements.

Preferably, the data collected by the detectors and sensors connected to the span 310 is forwarded to a main control panel 308 which preferably includes: a CPU, memory, processing software to receive and process collected data (as discussed in detail below), and one or more elements of control device 138 (discussed above with respect to FIG. 2). Alternatively, the received data may be collected and retransmitted to a remote server/the cloud for processing and analysis. In accordance with a further aspect of the present invention, the system may preferably further include a remote sensing element such as a sensor suite located on an unmanned aerial vehicle 302 (UAV) or manned aerial vehicle (MAV). Still further, the system is preferably further designed to receive, and process sensor data provided by satellite 304 or other high-altitude monitoring system.

In a preferred embodiment, a crop/soil analysis module is provided on a remote server 306 which receives a number of inputs from the sensors of the irrigation system 300. In this embodiment, the crop/soil analysis module preferably includes service-side software which may be accessed via the internet or other network architecture. Alternatively, the crop/soil analysis module and other aspects of the present invention may include client-side software residing in the main control panel 308 or at another site. Regardless, it should be understood that the system may be formed from any suitable, software, hardware, or both configured to implement the features of the present invention.

According to a further preferred embodiment, the systems of the present invention preferably operate together to collect and analyze data. According to one aspect of the present invention, the data is preferably collected from one or more sources including imaging and soil water content sensing data from UAVs 302, MAV, satellites 304, span mounted crop sensors 308, 314, as well as the weather station 322, center pivot or linear operational information and other system elements. Preferably, the combination and analysis of data is continually processed and updated. In accordance with a further preferred embodiment, the sensor data preferably includes frequently acquired aerial data of a resolution of 1 m to 3 m or better which is combined with satellite and span mounted sensor data and could integrate in situ soil or plant data.

Preferably, the crop/soil analysis module processes the aerial data to provide a full view of a given field which is combined and overlaid with span mounted sensor data which provides additional data in near real-time. The in-situ field data is preferably used as a check and provides baseline data. According to a preferred embodiment, the aerial data may be received from manned or unmanned vehicles (UAVs or drones). According to a further preferred embodiment, imaging data from satellites may be process and compared using vegetation indices such as but not limited to: RVI (ratio vegetation index), NDVI (normalized difference vegetation index), SAVI (soil-adjusted vegetation index), MASVI (modified soil-adjusted vegetation index) and RSR (reduced simple ratio index).

According to a further preferred embodiment, the crop/soil analysis module will preferably process, combine and evaluate data collected from all sources, update the water balance and generate irrigation management recommendations including but not limited to VRI. For example, the span mounted sensors may preferably provide field specific data of current field conditions and may preferably use the system's analytics to calculate crop water use, crop water stress index, plant production ratio and other indices. In addition, vegetation indices may preferably be calculated as checks against the values calculated from the aerial data and to provide information if cloud cover or other atmospheric interference is present. Still further, the crop/soil analysis module may further interface with the drive control and applicant pressure controls to autonomously create and execute an irrigation plan (such as to provide Variable Rate Irrigation or the like) which includes custom drive instructions and applicant dispersal rates for a given field.

According to further preferred embodiments, the present invention may preferably further include machine learning algorithms to process sensor puts and processed data. These algorithms may run as modules within the system controller device 138 or may alternatively be run as modules on remote systems. Preferably, the machine learning algorithms may preferably include data processing to improve the identification of crop health indicators as well as analysis of sensor data. Further, the machine learning algorithms of the present invention may preferably include data processing to recognize patterns in the sensor data compared with later determined outcomes.

While the above descriptions regarding the present invention contain much specificity, these should not be construed as limitations on the scope, but rather as examples. Many other variations are possible. For example, the processing elements of the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations such as computer, tablet or smart phone. Accordingly, data may preferably be uploaded to and downloaded from the present invention as needed. Additionally, although the present system is discussed primarily with regards to water, it should be understood that the present invention applies to any applicant, and water is simply an example. For example, mixtures of chemicals such fertilizers, herbicides and other applicants may preferably be selectively provided and disbursed by the disclosed system via any combination of tanks, injection pumps, control valves or the like.

Accordingly, the scope of the present invention should be determined not by the embodiments illustrated, but by the appended claims and their legal equivalents.

What is claimed is:

1. A system for use with a mechanized irrigation system having at least one span and a drive system for moving the span, wherein the system comprises:
    a plurality of span mounted sensors, wherein at least one span mounted sensor comprises at least one sensor configured to allow for the detection of crop data; wherein the crop data is selected from the group of crop data comprising: crop type, stage of grown, health, presence of weeds, presence of disease, presence of insects, and rate of growth;

a plurality of in situ sensors, wherein the plurality of in-situ sensors is comprised of at least one in situ soil sensor and one in situ crop sensor;

a plurality of weather sensors, wherein at least one weather sensor is configured to detect weather data; wherein the weather data is selected from the group of weather data comprising humidity, pressure, precipitation and temperature;

at least one aerial sensor, wherein the at least one aerial sensor comprises a sensor located on an unmanned aerial vehicle, a manned vehicle or a satellite; further wherein the at least one aerial sensor produces and transmits aerial data;

a crop/soil analysis module, wherein the crop/soil analysis module is configured to receive data from at least one span mounted sensor, at least one aerial sensor, at least one in situ sensor and at least one weather sensor; further wherein the crop/soil analysis module is configured to process collected data to generate irrigation management recommendations;

further wherein the crop/soil analysis module is configured to calculate crop water use, a crop water stress index and a plant production ratio based at least in part on data from the span mounted sensors;

further wherein the crop/soil analysis module is configured to determine the crop health of a given field based on one or more vegetation indexes;

further wherein the crop/soil analysis module is configured to compare a vegetation index against a vegetation index value calculated from the aerial data;

further wherein the crop/soil analysis module is further configured to interface with a drive control system and a water pressure system;

further wherein the crop/soil analysis module is further configured to autonomously create and execute an irrigation plan which comprises custom drive instructions and a plurality of applicant dispersal rates for a given field.

2. The system of claim 1, wherein the system further comprises a plurality of transducers which are configured to monitor the water pressures within the system.

3. The system of claim 2, wherein the system further comprises a flow meter for monitoring water flow in the system.

4. The system of claim 3, wherein the system further comprises at least one indirect crop sensor, wherein the indirect crop sensor is configured to indirectly determine the crop health in an area of the field.

5. The system of claim 4, wherein at least one weather sensor is configured to detect the intensity of solar radiation.

6. The system of claim 5, wherein the system further comprises an aerial image sensor to receive aerial data from a satellite, UAV or MAV.

7. The system of claim 6, wherein the crop/soil analysis module is comprised of service-side software which may be remotely accessed.

8. The system of claim 7, wherein the crop/soil analysis module is configured to process aerial data of a resolution of 1.0 to 3 m together with span mounted sensor data and in situ crop data.

9. The system of claim 8, wherein the crop/soil analysis module is configured to process the aerial data to provide a full view of a given field and to combine the aerial data with span mounted sensor data in near real-time.

10. The system of claim 8, wherein the crop/soil analysis module is configured to use in-situ field data to compare against the aerial data received from the at least one aerial sensor.

11. The system of claim 10, wherein the span mounted sensors are configured to provide field specific data of current crop and field conditions; further wherein the crop/soil analysis module is configured to calibrate at least one span mounted sensor using data produced by the crop/soil analysis module; further wherein the crop/soil analysis module is configured to calibrate at least one span mounted sensor based on a data selected from the group of data comprising: crop water use, crop water stress index, and plant production ratio.

12. The system of claim 11, wherein the crop/soil analysis module is configured to interface with the drive control and applicant pressure controls to autonomously create and execute an irrigation plan comprising drive instructions and applicant dispersal rates for a given field based on data processed from at least one re-calibrated sensors.

13. The system of claim 12, wherein the crop/soil analysis module is configured to compare a vegetation index against a crop index value calculated from the aerial data.

14. The system of claim 13, wherein the crop/soil analysis module is further configured to send the irrigation plan to an operator via computer, smart phone or tablet for approval before executing the instructions.

15. The system of claim 14, wherein the system further comprises at least one indirect crop sensor, wherein the indirect crop sensor is configured to indirectly determine moisture levels in an area of the field.

* * * * *